United States Patent
Nakamura

[11] Patent Number: 6,000,194
[45] Date of Patent: Dec. 14, 1999

[54] CONCRETE-MADE PANEL AND METHOD OF FABRICATING THE SAME

[75] Inventor: Mitsuo Nakamura, Dazaifu, Japan

[73] Assignee: JOIST Co., Ltd., Fukuoka, Japan

[21] Appl. No.: 09/045,880

[22] Filed: Mar. 18, 1998

Related U.S. Application Data

[63] Continuation of application No. PCT/JP97/02141, Jun. 20, 1997.

[30] Foreign Application Priority Data

Jul. 12, 1996 [JP] Japan ................................. 8-203137

[51] Int. Cl.$^6$ ............................. E04C 1/00; E04C 2/32; E04C 2/34
[52] U.S. Cl. .................................. 52/783.17; 52/309.17; 52/405.3; 52/414; 52/794.1; 52/309.12
[58] Field of Search ........................... 52/309.2, 309.12, 52/309.17, 405.3, 414, 783.17, 783.19, 794.1, 405.1

[56] References Cited

U.S. PATENT DOCUMENTS

| | | | |
|---|---|---|---|
| 3,474,583 | 10/1969 | Manias | 52/309.2 X |
| 3,956,864 | 5/1976 | Fung | 52/414 |
| 4,125,981 | 11/1978 | MacLeod et al. | 52/309.12 |
| 4,206,267 | 6/1980 | Jungbluth | 52/309.17 X |
| 4,517,782 | 5/1985 | Shamszadeh | 52/309.2 X |
| 4,768,324 | 9/1988 | Hibbard | 52/309.12 X |
| 4,974,381 | 12/1990 | Marks | 52/309.12 |
| 5,440,845 | 8/1995 | Tadros et al. | 52/309.12 |

FOREIGN PATENT DOCUMENTS

| | | |
|---|---|---|
| 60-164540 | 8/1985 | Japan . |
| 5-171736 | 7/1993 | Japan . |
| 7/90972 | 9/1993 | Japan . |

*Primary Examiner*—Christopher T. Kent
*Assistant Examiner*—Brian E. Glessner
*Attorney, Agent, or Firm*—Griffin, Butler, Whisenhunt & Szipl, LLP

[57] ABSTRACT

A pair of first and second concrete layers (1, 2) spaced away from each other by a certain distance are connected to each other through a corrugated plate (3) having a uniform magnitude of amplitude so that there are formed a space between the concrete layers (1, 2). A weight of a concrete-made panel is decreased by this hollow structure. A corrugated plate (3) is designed to have a trapezoidal cross-section of rectangular corrugation. By sinking mountain and valley portions of the corrugated plate into the first and second concrete layers (1, 2), the concrete-made panel can have enhanced compressive strength in a direction of corrugation of the corrugated plate (3), and have enhanced rigidity because of diagonal members of a truss which keeps the concrete-made panel being kept to be a plane.

9 Claims, 11 Drawing Sheets

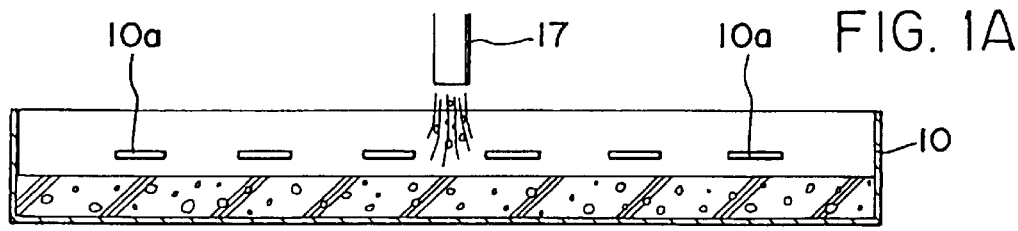
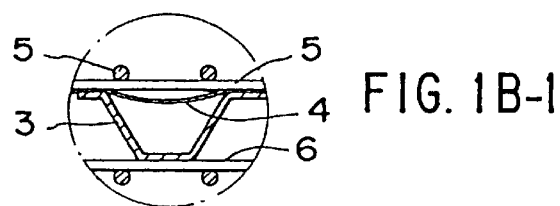
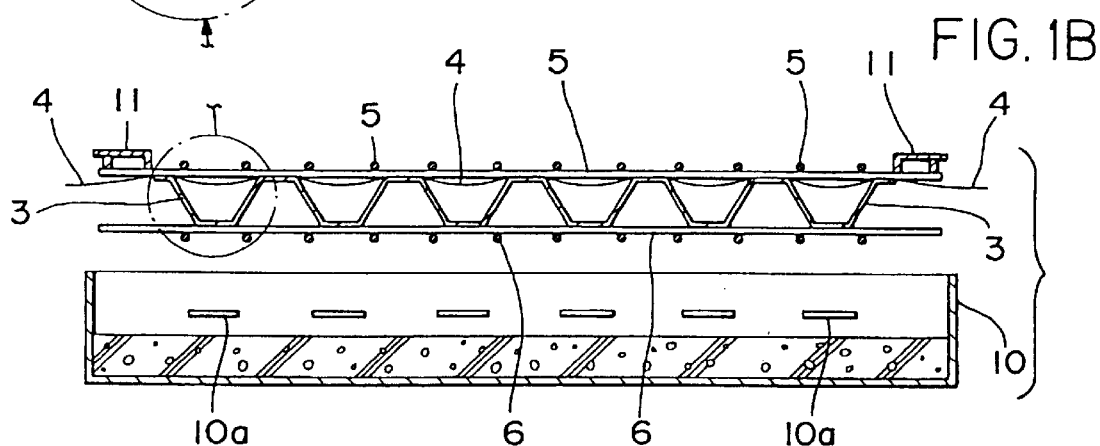
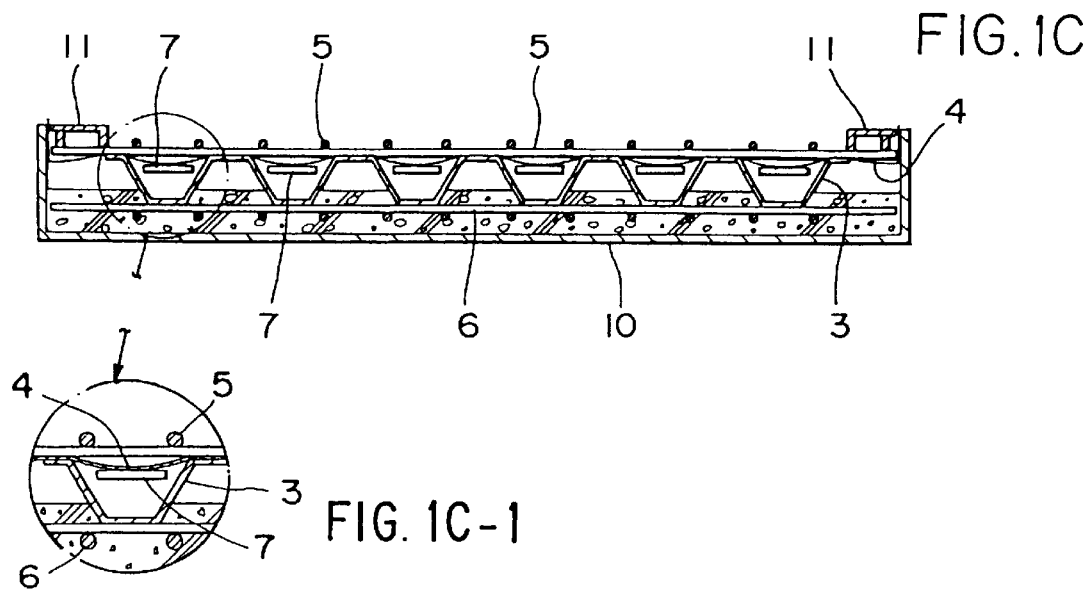

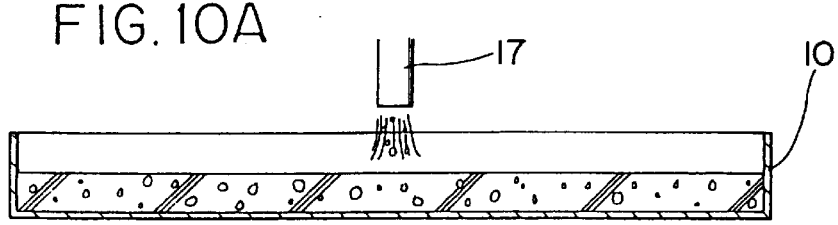
FIG. 10A
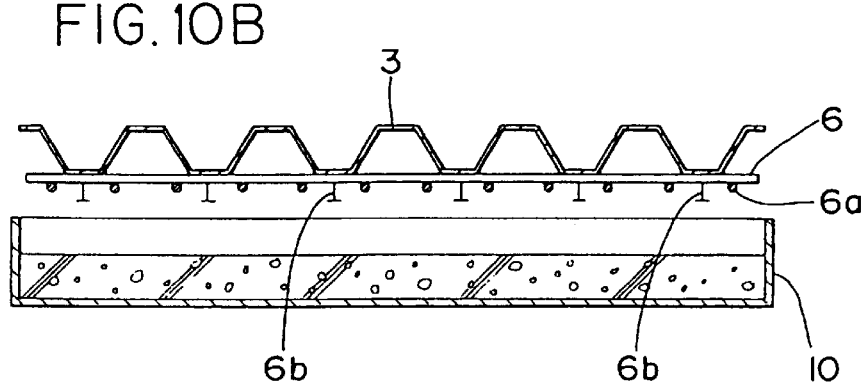
FIG. 10B
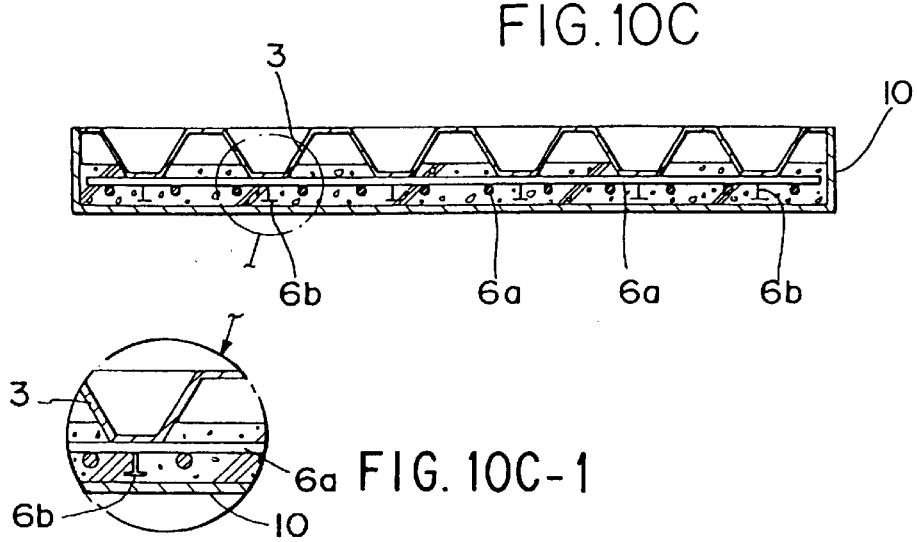
FIG. 10C
FIG. 10C-1
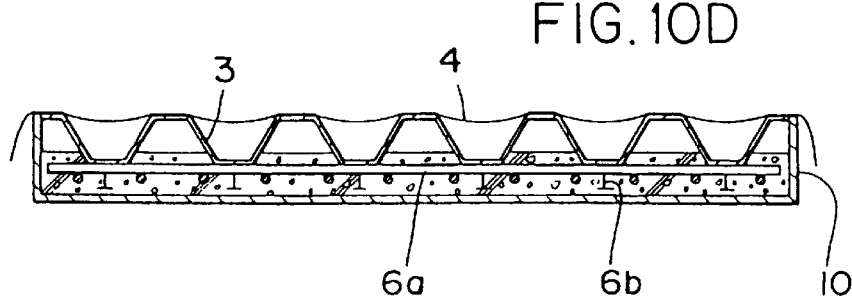
FIG. 10D

CONCRETE-MADE PANEL AND METHOD OF FABRICATING THE SAME

CROSS REFERENCES TO RELATED APPLICATIONS

This application is a continuation of PCT/JP97/02141, filed on Jun. 20, 1997 and published on Jan. 22, 1998, which claims priority on JP8-203137, Filed on Jul. 12, 1996.

TECHNICAL FIELD

The invention relates to a concrete-made panel used for a construction floor, a roof, a construction wall, and a wall plate of an outer wall in a concrete-made structure, and a floor made of steel framed reinforced concrete, and more particularly to a concrete-made panel which is light-weight and superior in heat and sound insulation, and a method of fabricating such a concrete-made panel.

BACKGROUND ART

A construction floor, a roof, a wall, and a construction wall plate of an outer wall in a concrete-made structure and a floor made of steel framed reinforced concrete have been conventionally fabricated by forming a certain temporary form in a construction site, arranging reinforcing steels, if necessary, and introducing concrete into the form and hardening concrete. In place of the construction employing a form in a construction site, there have been widely used a construction method of preparing a concrete-made panel which has been in advance made in a factory, that is, a so-called pre-cast plate, and carrying the pre-cast plate to a construction site, and attaching the pre-cast plate to a structure, because the construction method makes it possible to enhance workability and shorten a construction period.

In the conventional construction methods as mentioned above, the method including the steps of constructing a temporary form in a construction site and introducing concrete into the form takes much time and effort in constructing a temporary form in a construction site, introducing concrete into the form, and curing the concrete. Hence, the construction cost is increased, and there is a limitation in shortening the construction period. In addition, since a large amount of concrete is used, the resulting structure weighs much. In the case of a skyscraper, there would arise a limitation that larger beams have to be used in underlying floors.

With respect to an increase in weight due to employing concrete, it would be possible to used light-weight concrete in place of ordinary concrete to thereby lighten a structure. However, since the conventional light-weight concrete lacks strength, a construction has be made thicker in order to compensate for the lack of strength, resulting in additional limitations in designing a construction.

On the other hand, the method of in advance fabricating concrete-made panels in a factory for enhancing workability, the most important point is to make the concrete-made panels light-weight, as much as possible, in order to enhance transfer efficiency from a factory to a construction site and also improve handling efficiency. The applicant of the present invention has already suggested a light-weighted concrete-made panel in Japanese Patent Application No. 5-257706, which was published as Japanese Unexamined Patent Publication No. 7-90972.

The concrete-made panel disclosed in the Publication is comprised of a pair of non-flammable boards vertically spaced away from each other, a corrugated steel plate sandwiched between the pair of the non-flammable boards, an outer frame securing to the corrugated steel plate at its periphery for sealing, and hard foaming resin filled in the outer frame. The concrete-made panel is ensured to have a sufficient strength since the corrugated steel plate has a sufficient strength, and to be more light-weight in comparison with conventional light-weight concrete.

The corrugated steel plate is arranged in such a way that outer surfaces of mountain (peak) and valley (trough) portions thereof are in abutment with surfaces of the non-flammable boards, and thus a restraint force does scarcely exert between the corrugated steel plate and the non-flammable boards in a direction of corrugation pitch of the corrugated steel plate. In other words, the upper non-flammable board is supported by the outer frame so that the non-flammable boards are mounted on the mountain or peak portions of the corrugated steel plate, and that the lower non-flammable board makes contact with the valley or trough portions of the corrugated steel plate. Hence, the corrugated steel plate provides compensation against a vertical compression force, and, the corrugated steel plate provides a little support against an external force acting on the non-flammable board in a direction of the corrugation pitch.

As mentioned above, by employing the corrugated steel plate, a construction can be made light-weight. However, since a restraint force is small in a direction of the corrugation pitch between the non-flammable boards and the corrugated steel plate, an extra retaining structure has to be added when the non-flammable boards and the corrugated steel plate are connected to each other through the outer frame.

It is of course possible to integrally form a concrete-made panel including a corrugated steel plate therein, an outer frame, and an upper and lower non-flammable boards through concrete. To this end, a frame acting as a container is used in combination with a core. Employing a core, there is formed a mold having a cavity into which a corrugated steel plate is to be inserted.

However, even if such a mold is used, after a hollow concrete-made panel has been fabricated, a corrugated steel plate is inserted into the concrete-made panel. Thus, mountain or peak and valley trough portions of the corrugated steel plate simply make abutment with an inner wall of the cavity of the concrete-made panel. Accordingly, similarly to the above, sufficient strength can be obtained against compression, however the restraint between the corrugated steel plate and the concrete-made panel in a direction of the corrugation pitch is left small.

The concrete-made panel having a corrugated steel plate therein is preferable with respect to making the panel light-weight, there remains a unsolved problems about the connection between a cover material of concrete and a corrugated steel plate.

It is an object of the present invention to provide a concrete-made panel which is light-weight, has a high strength, and is superior in heat and sound insulation, and a method of fabricating the same.

DISCLOSURE OF THE INVENTION

In the present invention, first and second concrete layers are integrally formed through a reinforcement member or a corrugated plate which is able to form a space, to thereby form a concrete-made panel, which makes it possible to make a concrete-made panel more light-weight than a solid concrete-made panel. When a corrugated plate is employed, mountain or peak and valley or trough portions are partially immerged into associated concrete layers, which ensures greater restraint between concrete layers and a corrugated plate.

By filling a space formed inside the corrugated plate with foaming resin, it is possible to further enhance the strength of the corrugated plate and a finished concrete-made panel, and also to further enhance heat, sound and vibration insulation.

By positioning an edge of the corrugated plate between an edge and an inside of the concrete layers, it is possible for the finished concrete-made panel to have a recessed portion at an outer edge thereof. By introducing concrete into the recessed portion in a construction site to thereby connect the concrete-made panel to the corrugated plate, they can be firmly connected to each other.

By reinforcing the concrete layers with reinforcing steels, the concrete-made panel can have an enhanced strength. In addition, by designing the reinforcing steels to have a length projecting out of an end of the concrete layers, it would be possible to strengthen connection between other walls or constructions and the concrete-made panel.

By arranging anchors to be immerged into the concrete layers, it is possible to enhance the connection between the corrugated plate and the concrete layers.

If the concrete layers are made of concrete having ingredients of heat resistant hollow fine particles in the range of 6 to 25 weight % which are formed in the process of alteration to non-powder smokeless slug, cement and aggregates which are all mixed with water, it would be possible to have almost the same strength as that of ordinary concrete because of the hollow fine particles, even though the concrete is light-weight, specifically has a specific gravity of about 1.0, ensuring that the concrete layers are more light-weight but have a greater strength, and have a hard surface. In particular, when light-weight aggregates having an average specific gravity of smaller than 1.5 are mixed with cement at 30 to 55 weight % and at 10 to 50 weight %, respectively, there can be obtained a significant effect, when the hollow fine particles have the size in the range of 40 to 200 $\mu$m.

A concrete-made panel in accordance with the present invention is made of a mixture of cement and light-weight aggregates. In order to be more light-weight and have a greater strength, and have a hard surface and a greater abrasion resistance, it is preferable for the concrete-made panel to include heat resistant hollow fine particles having a size in the range of 40 to 200 $\mu$m at 6 to 25 weight %, light-weight aggregates having a specific gravity of 1.5 or smaller at 30 to 55 weight %, and cement at 10 to 55 weight %.

BRIEF DESCRIPTION OF THE DRAWINGS

FIGS. 1A–1C illustrates a method in accordance with the present invention including steps from introducing light-weight concrete to a form to positioning a corrugated plate to which reinforcing steels and a formation sheet have been in advance attached;

FIGS. 10A–10D illustrates steps in order of another method of fabricating a concrete-made panel;

BEST MODE FOR CARRYING OUT THE INVENTION

Figure 2A:
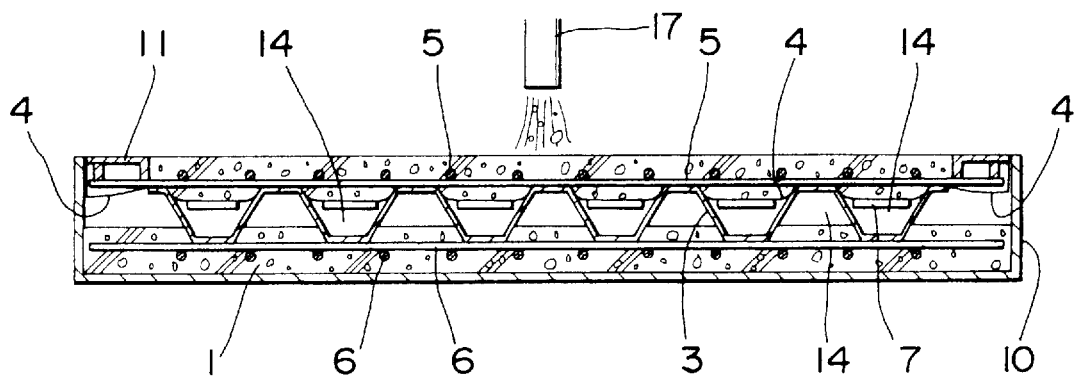
FIGS. 2A–2C illustrates steps until foaming resin is filled, to be carried out following the steps illustrated in FIGS. 1A–1C.
Figure 2B:
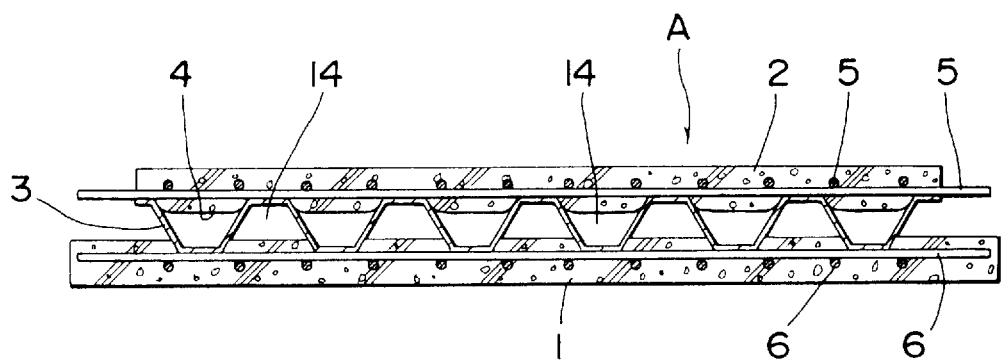
Figure 3:
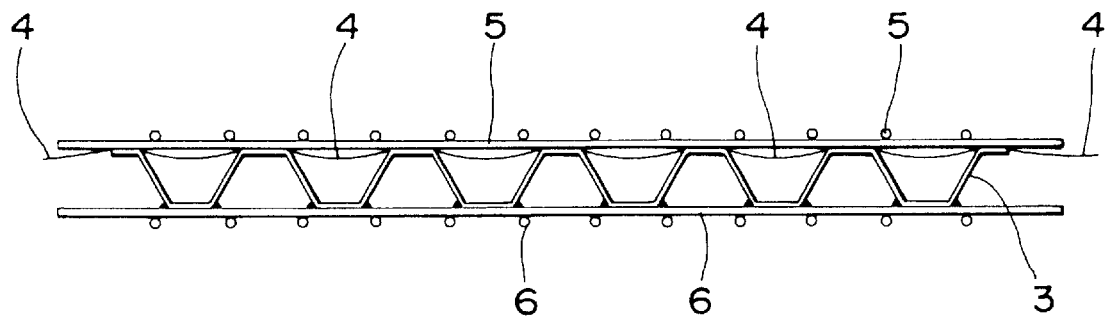
FIG. 3 is a front view of a corrugated plate to which the reinforcing steels and the formation sheet are secured.
Figure 4:
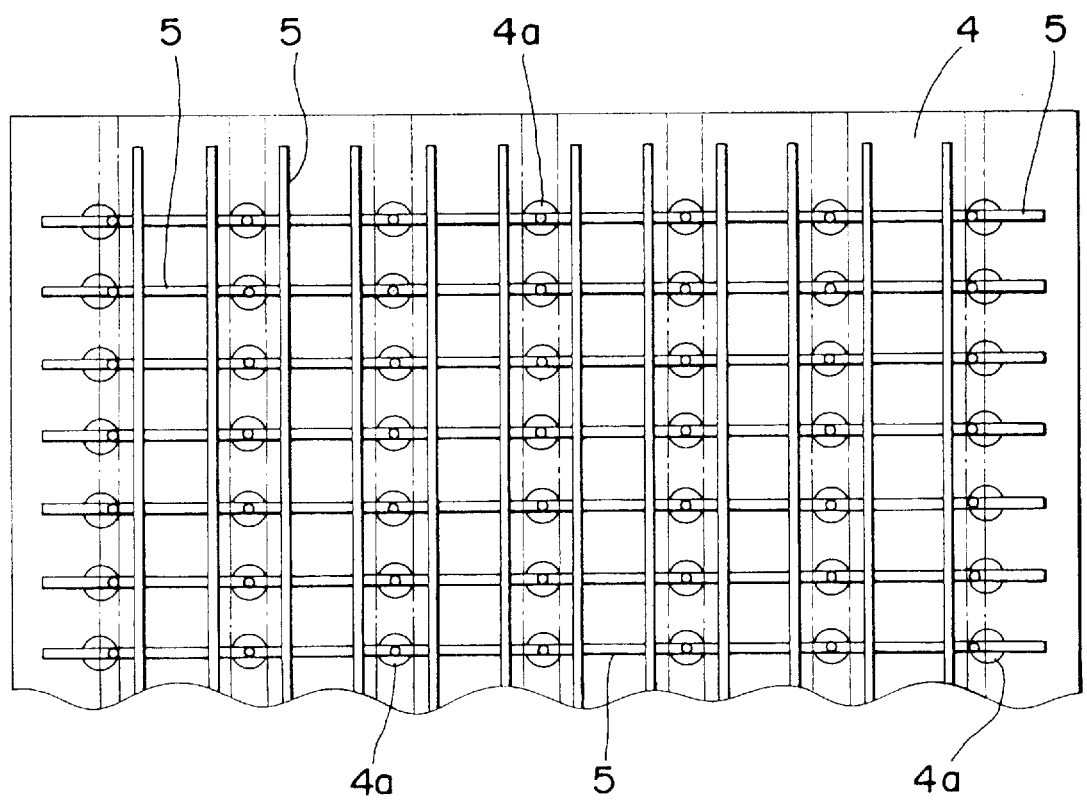
FIG. 4 is a plan view showing a positional relation between the formation sheet and the reinforcing steels.

FIGS. 1 and 2 are cross-sectional views illustrating steps of a method of fabricating a concrete-made panel in accordance with the present invention, employing a form. A combination of a corrugated plate and reinforcing steels which is to be prepared prior to the formation of the form, and a formation sheet assembled into the combination are illustrated in FIG. 3 as a front view, FIG. 4 as a plan view, and FIG. 5 as an exploded perspective view.

Figure 5:
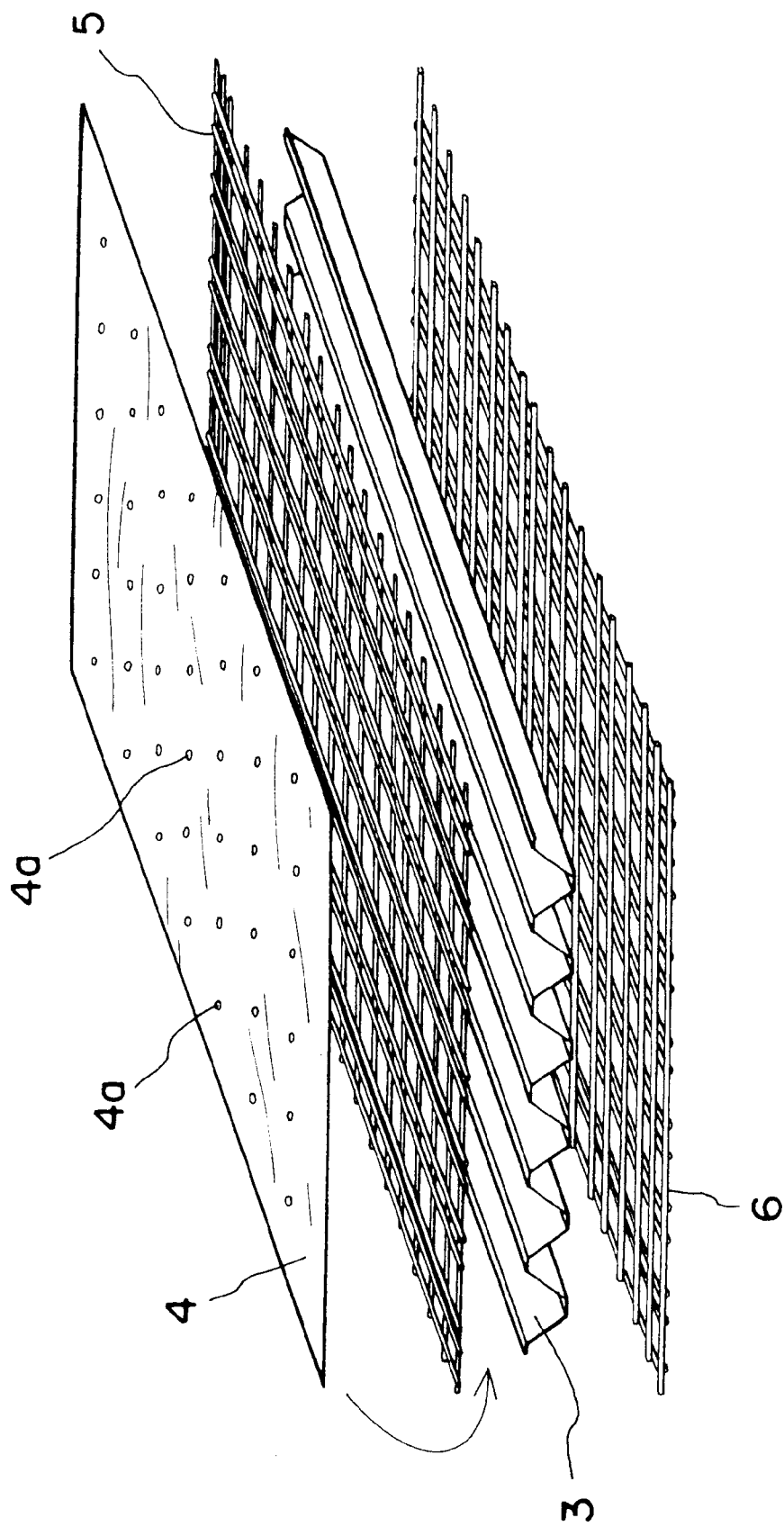
FIG. 5 is an exploded perspective view illustrating the reinforcing steels, the formation sheet, and the corrugated plate.

A member incorporated as a reinforcement into a concrete-made panel in accordance with the present invention is comprised of, as illustrated in FIG. 5, a corrugated plate 3, two grid-shaped reinforcing steel nets 5 and 6 for sandwiching the corrugated plate 3 therebetween, and a formation sheet 4 to cover the upper reinforcing steel net 5.

The corrugated plate 3 has a uniform cross-section of rectangular corrugation which is substantially approximated to a trapezoid, as illustrated. The corrugated plate 3 has a thickness and a longitudinal length which are varied in dependence on application of the concrete-made panel and a required strength. For instance, if the finished concrete-made panel has a thickness in the range of 160 to 240 mm, it is preferable that the thickness is in the range of about 0.8 to about 1.6 mm, and a height is in the range of about 80 to about 150 mm.

The formation sheet 4 is made of, for instance, a polyethylene sheet having a thickness of about 0.15 mm, and, as illustrated in FIG. 5, is formed with a lot of holes 4a all over a surface thereof. The holes 4a are positioned to be located at welding points when reinforcing steels of the grid-shaped reinforcing steel net 5 are welded to mountain or peak portions of the corrugated plate 3, ensuring the formation sheet 4 from being molten during welding.

The reinforcing steel nets 5 and 6 are made of reinforcing steels having a diameter of about 6 mm, and are formed by arranging the reinforcing steels vertically and horizontally with a certain space therebetween in a grid, and welding some of intersections of the reinforcing steels or fastening the intersections with fasteners.

Figure 6:
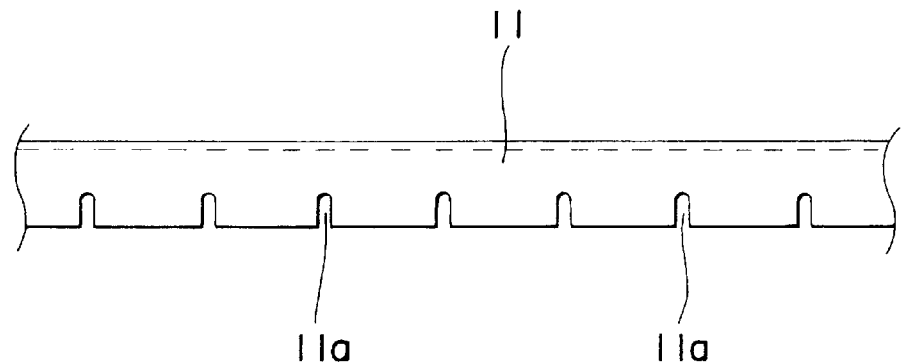
FIG. 6 is a front view of a gist of a form liner.

As illustrated in FIG. 3, the corrugated plate 3, the formation sheet 4, and the reinforcing steel nets 5 and 6 are deposited so that the reinforcing steel net 6 lies at a bottom, and the corrugated plate 3, the formation sheet 4, and the reinforcing steel net 5 are stuck on the reinforcing steel net 6 in this order. The reinforcing steel nets 5 and 6 are welded to summits of mountains and bottoms of valleys of the corrugated plate 3. As mentioned earlier, the formation sheet 4 is positioned so that the holes 4a are located at welding points of reinforcing steel bars of the net 5 to the corrugated plate 3. A form liner 11 illustrated in FIG. 6 is integrally attached to the upper reinforcing steel net 5. The form liner 11 is made of L-shaped beams. The form liner 11 is formed with a plurality of slots 11a by the same pitch as the pitch of the reinforcing steel bars of the net 5. By upwardly fitting the slots 11a to the reinforcing steel bars, the form liner is connected to the upper reinforcing steel net 5 at its periphery like a picture frame, as illustrated in FIG. 1(b).

Thus, prior to the formation of the concrete-made panel, there is prepared an assembly comprised of the corrugated plate 3, the formation sheet 4, the reinforcing steel nets 5 and 6, and the form liner 11, which is to be inserted on the concrete-made panel. Then, the concrete-made panel starts to be fabricated, employing a kit-shaped form 11 illustrated in FIG. 1(a).

The form 10 is formed at opposite facing sidewalls perpendicular to a direction of the corrugation pitch of the corrugated plate 3 with slits 10a located between the mountain portions of the corrugated plate 3. As illustrated in FIG. 1(c), support members 7 having a flat cross-section can be inserted or drawn out through the slits 10a. The support members 7 are fixedly positioned at locations illustrated in FIG. 1(c) when inserted into the slits 10a, and play a role of preventing the formation sheet 4 lying on the support members 7 from being downwardly suspended. The concrete-made panel is fabricated as follows by the use of the form 10.

First, as illustrated in FIG. 1(a), light-weight concrete is introduced into the form 10 at a depth lower than the half of a height of the form through a concrete supply hose 17. Then, before the light-weight concrete is solidified, the corrugated plate 3 and the upper reinforcing steel net 5 together with the formation sheet 4 are dropped into the form 10 with the reinforcing steel net 6 facing downwardly. The corrugated plate 3 is immerged so that the valley portions are immerged by about 2 cm into the light-weight concrete and that an outer edge of the formation sheet 4 is sandwiched between an inner surface of the form 10 and an outer surface of the form liner 11 to thereby extend therebeyond. Thus, as illustrated in FIG. 1(c), the assembly having the corrugated plate 3 is fixed into the form 10. The assembly is firmly fixed to the form 10 by means of a clamping apparatus (not illustrated). After clamping the assembly having the corrugated plate 3, the support members 7 are inserted into the form through the slits 10a to thereby support the formation sheet 4 hung between the mountain portions of the corrugated plate 3.

Then, as illustrated in FIG. 2(a), the light-weight concrete is introduced to a region formed by the formation sheet 4 so as to constitute a bottom surface of a space surrounded by the form liner 11, through the concrete supply hose 17, until the concrete reaches approximately a level of an upper edge 11. The formation sheet 4 is forced to spread downwardly due to weight of the introduced light-weight concrete. However, since the support members 7 support a lower surface of the formation sheet, the formation sheet 4 is not deformed in U-shape, but deformed in accordance with the summits of the mountain portions of the corrugated plate 3, keeping a lower surface thereof almost horizontal. Thus, the light-weight concrete is solidified with the mountain portions of the corrugated plate 3 being inserted into the light-weight concrete.

After the light-weight concrete introduced over the corrugated plate 3 has been solidified, the form liner 11 is upwardly drawn out of the reinforcing steel bars of the reinforcing steel net 5, and similarly, the form 10 is also downwardly drawn out. Thus, there is obtained a concrete-made panel A including a first concrete layer 1 having the reinforcing steel net 6 and the valley portions of the corrugated plate 3, and a second concrete layer 2 having the reinforcing steel net 5 and the mountain portions of the corrugated plate 3.

Figure 2C:
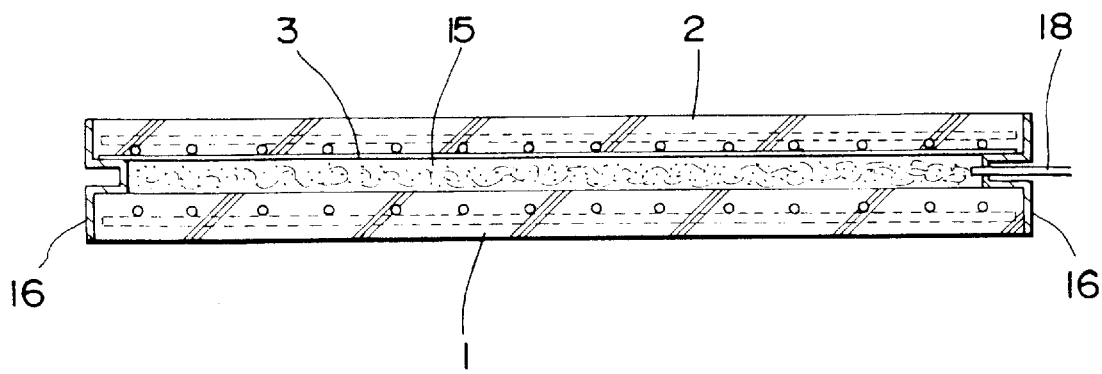

After the formation of the concrete-made panel A, as illustrated in FIG. 2(c), the concrete-made panel is covered at opposite ends perpendicular to a direction of the corrugation pitch of the corrugated plate 3 with a covering jig 16, and then a foaming resin supply tube 18 is connected to the covering jig 16. The foaming resin supply tube 18 is communicated with spaces formed between the mountain portions of the corrugated plate 3. Foaming resin 15 having about 30 times foam is supplied into the spaces through the foaming resin supply tube 18.

Figure 7:
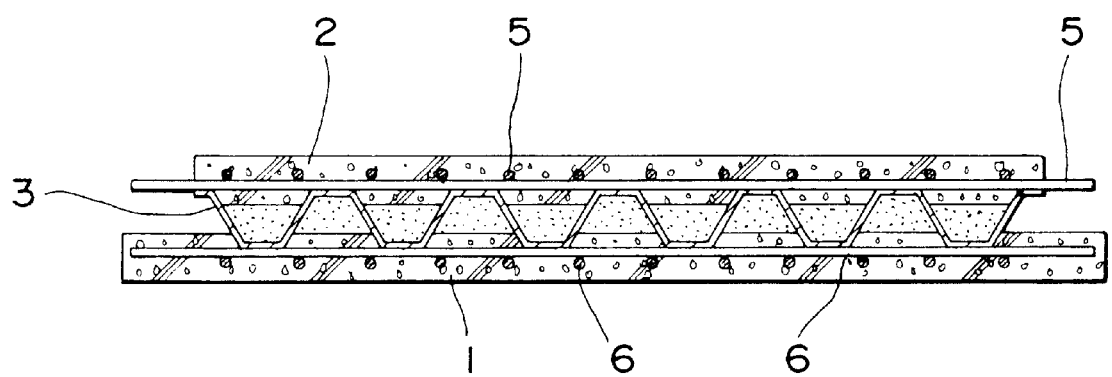
FIG. 7 is a longitudinal cross-sectional view of the finished concrete-made panel.
Figure 8:
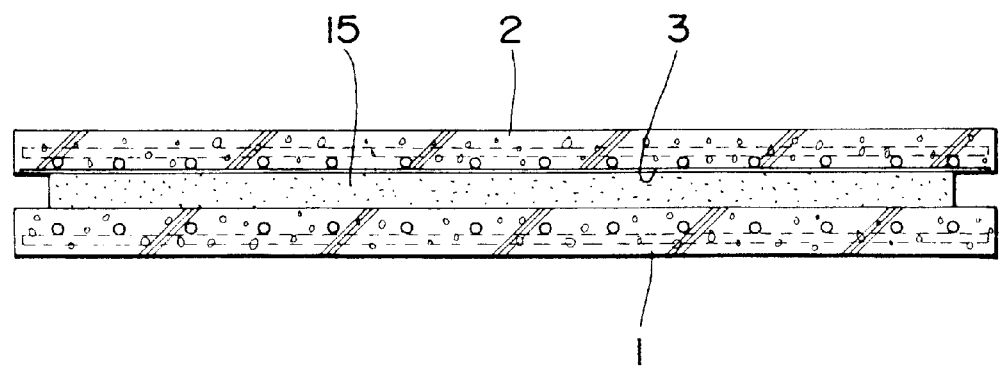
FIG. 8 is a front view of the finished concrete.

After the supply of the foaming resin 15, the covering jig 16 is removed. Then, as illustrated in a cross-sectional view of FIG. 7, a front view of FIG. 8, and a perspective view of FIG. 9, there can be obtained the finished concrete-made panel A including the corrugated plate 3 which is filled with the foaming resin 15.

In the thus formed concrete-made panel A, as illustrated in FIG. 2(c), the valley and mountain portions of the corrugated plate 3 are immerged in the first and second concrete layers 1 and 2, respectively. Hence, as the corrugated plate 3 is fixed to the first and second concrete layers 1 and 2 horizontally at a constant pitch to thereby reinforce the concrete-made panel A, the concrete-made panel A has an enhanced strength against horizontal compression.

The corrugated plate 3 has a trapezoidal cross-section of rectangular corrugation, and substantially constitutes a truss, which enhances rigidity thereof. Thus, it is possible to enhance not only a compressive strength in a horizontal direction in FIG. 2(c), namely a direction of the corrugation pitch, but also a compressive strength in a direction between the first and second concrete layers 1 and 2. Thus, the corrugated plate 3 has a cross-section like a truss, the concrete-made panel A has sufficient strength against load or dynamic load because of the effect of keeping the first and second concrete layers 1 and 2 planar, ensuring it is not necessary for the corrugated plate 3 to have a thicker thickness. Accordingly, it would be possible to lighten the corrugated plate 3, which ensures the concrete-made panel A to become more light-weight, enhancing workability.

In place of the corrugated plate 3 having a trapezoidal cross-section of rectangular corrugation, H-shaped beams, I-shaped beams, or circular pipes may be used as a reinforcement and inserted between the first and second concrete layers 1 and 2.

For instance, when H-shaped beams are used, they are spaced away from each other by a certain distance with lower and upper ends of the H-shaped cross-section being sunk into the first and second concrete layers 1 and 2, and are connected to each other by a planar plate at a certain height in a height-wise direction of the H-shaped beams. Thus, between the first and second concrete layers 1 and 2 may be positioned an arrangement of H-shaped beams integrally connected to each other by means of planar plates, which ensures that the first and second concrete layers 1 and 2 are reinforced.

When I-shaped beams are used, I-shaped beams are connected to one another by means of planar plates at a certain height in a height-wise direction of the I-shaped beams so that the I-shaped beams are spaced away from each other. The thus connected I-shaped beams are sandwiched between the first and second concrete layers 1 and 2 with lower and upper ends of the I-shaped beams being sunk into the first and second concrete layer 1 and 2. When circular pipes are used, a plurality of pipes are connected to one another by means of a planar plate positioned in a plane passing centers of the cross-sections with lower and upper ends of the pipes being sunk into the first and second concrete layer 1 and 2

As mentioned above, when H-shaped beams, I-shaped beams or pipes are used as a reinforcement, the concrete-made panel A is based on a hollow structure comprised of the first and second concrete layers 1 and 2 and the reinforcements. Hence, it is possible to lighten the concrete-made panel A and enhance a strength of the same, similarly to the previously mentioned embodiment.

As mentioned earlier, since the corrugated plate 3 has a truss-like, trapezoidal cross-section of rectangular corrugation, the corrugated plate 3 protects the concrete-made panel A from being deformed by an external force acting thereon. On the other hand, when H-shaped beams, I-shaped beams or pipes are used as a reinforcement, there is not contained a member corresponding to a diagonal member in a truss. Hence, there is a limitation for enhancing a strength against horizontal compression and vertically compression in FIG. 2(c). However, if spaces formed between the first and second concrete layers 1 and 2 and the reinforcements are filled with the foaming resin 15 as mentioned in the previously mentioned embodiment, it would be possible to compensate for a strength to some degree, ensuring workability in practical use. In the previously mentioned embodiment, since the corrugated plate 3 has an element corresponding to a diagonal member, the corrugated plate 3 ensures the concrete-made panel A to have a sufficient strength. Thus, it is not always necessary to use the foaming resin 15, which means that the corrugated plate 3 having a trapezoidal cross-section of rectangular corrugation is the best choice.

FIGS. 10 and 11 illustrate steps of another method. Elements corresponding to the previously mentioned embodiment have been provided with the same reference numerals, and will not be explained in detail.

In the instant embodiment, only the lower reinforcing steel net 6 is in advance welded to a bottom surface of the corrugated plate 3, the desired number of T-shaped anchors 6b are fixed to the reinforcing steel bars 6a of the reinforcing steel net 6 in order to enhance a connection between the reinforcing steel net 6 and the first concrete layer 1. Similarly to the previously mentioned embodiment, after light-weight concrete has been introduced into the form (FIG. 10(a)), the corrugated plate 3 and the reinforcing steel net 6 are dropped into the form 10 in a position as illustrated in FIG. 10(b) (FIG. 10(c)), thereby the valley portions of the corrugated plate 3 being immerged by about 2 cm. As illustrated in FIG. 10(c), the form 10 is set so that an upper edge of the form 10 is level with the mountain portions of the corrugated plate 3 when the corrugated plate 3 is immerged in the light-weight concrete. The form 10 is covered with the formation sheet 4 so that an end of the formation sheet is hung out of an outer edge of the form 10 (FIG. 10(d)).

Figure 11A:
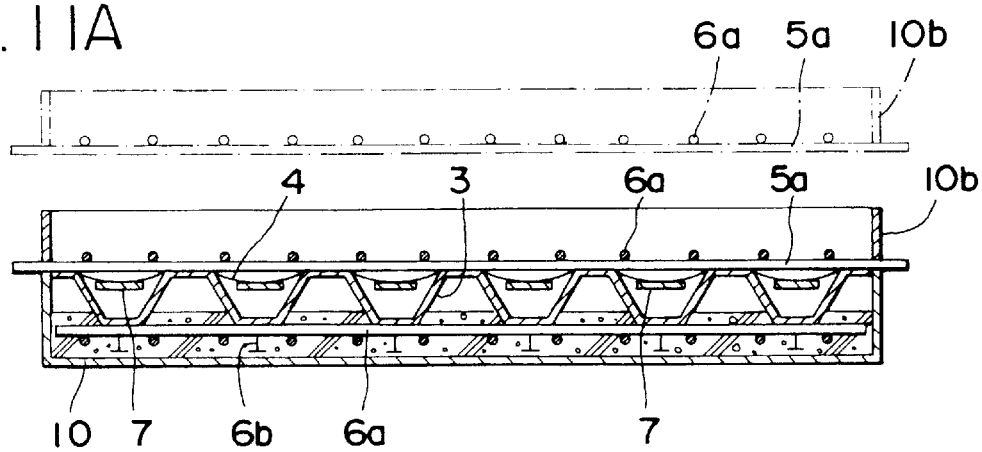
FIGS. 11A–11D illustrates steps until the concrete-made panel is formed, to be carried out following FIGS. 10A–10D.
Figure 11B:
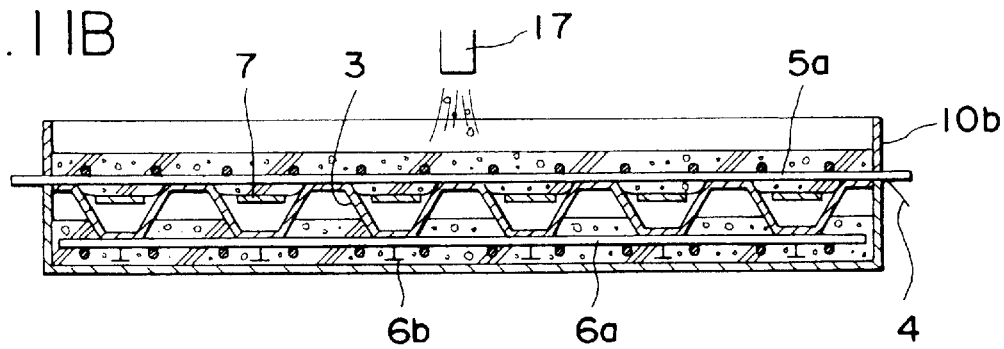
Figure 11C:
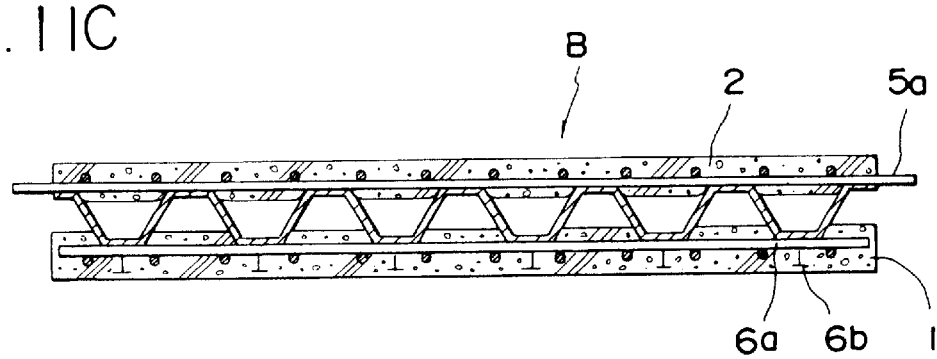
Figure 11D:
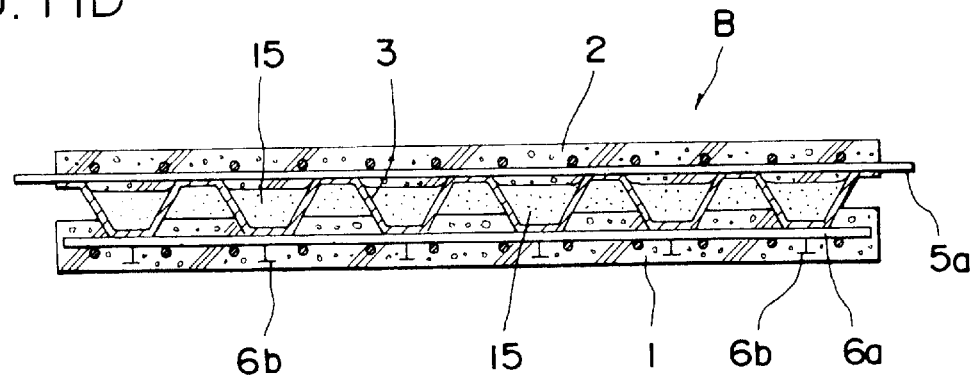

A second form 10b formed with slots as illustrated in FIG. 6 starting from a lower edge of the second form is detachably engagable to the reinforcing steel net 5. As illustrated in FIG. 11(a), the form 10 is covered on its upper surface with the second form 10b, thereby only ends of the reinforcing steel bars of the reinforcing steel net 5 projects out of the second form 10b, and an inner surface of the second form 10b and the formation sheet 4 cooperate with each other to form a kit-shaped form.

After setting the second form 10b, there are carried out the same steps as those of the previously mentioned embodiment. Namely, the light-weight concrete is introduced onto the formation sheet 4 through the concrete supply tube 17 (FIG. 11(b)), the forms 10a and 10b are removed (FIG. 11(c)), and the foaming resin 15 is filled, thereby there is obtained a concrete-made panel B including the first and second concrete layers joined together through the corrugated plate 3.

Figure 9:
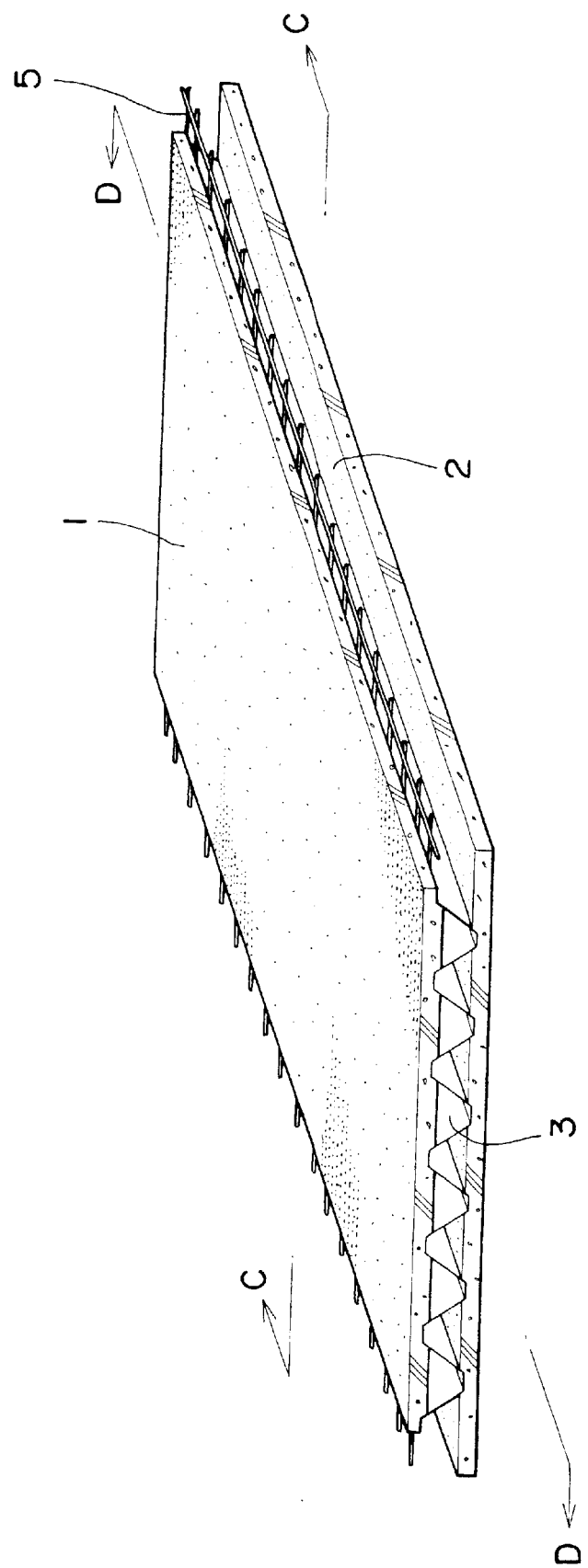
FIG. 9 is a perspective view of the finished concrete-made panel.
Figure 12A:
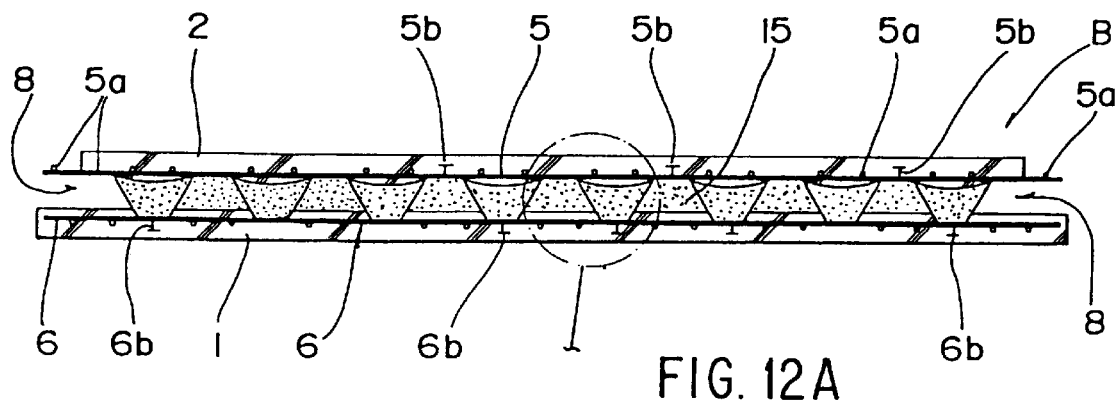
FIG. 12 is a cross-sectional view illustrating reinforcing steels housed in the first and second concrete layers being connected to the concrete layers.
Figure 12B:
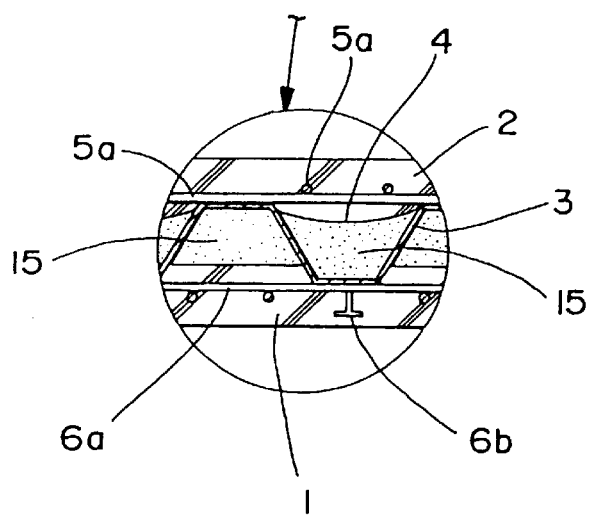
Figure 13:
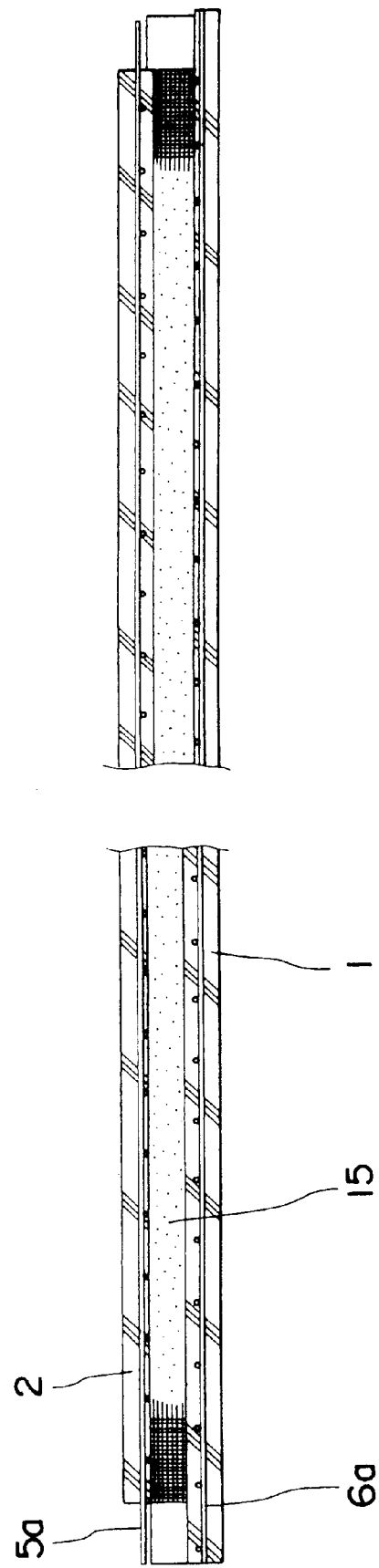
FIG. 13 is a front view of the concrete-made panel illustrated in FIG. 12.

FIGS. 12 and 13 are cross-sectional views illustrating the detail of the concrete-made panel B fabricated through the steps illustrated in FIGS. 10 and 11. FIG. 12 is a cross-sectional view taken along the line C—C in FIG. 9, and FIG. 13 is a cross-sectional view taken along the line D—D in FIG. 9.

In an example illustrated in FIG. 12, the first concrete layer 1 is longer than the second concrete layer 2 in a direction of the corrugation pitch, and is equal in length to a combination of the second concrete layer and the reinforcing steel bars 5a of the reinforcing steel net 5 projecting out of the second concrete layer 2. The first concrete layer 1 can have such a dimension by designing the second form 10b to have a slightly smaller dimension than the form 10 illustrated in FIGS. 10 and 11. T-shaped anchors 5b are provided not only with the reinforcing steel net 6, but also with the reinforcing steel bars 5a of the reinforcing steel net 5 included in the second concrete layer 2.

By designing a surface area of the corrugated plate 3 to be smaller than those of the first and second concrete layers 1 and 2, it is possible to form a recessed portion 8 at a periphery of the corrugated plate 3 between the first and second concrete layers 1 and 2. The recessed portion 8 ensures enhanced connection between the concrete-made panel B and a construction in which the concrete-made panel B is to be used, because ready-mixed concrete fills the recessed portion 8 therewith and solidifies there. By making the reinforcing steel bars 5a project out of the second concrete layer 2 as illustrated, it acts as a reinforcement in the ready-mixed concrete, ensuring enhancement of a strength.

The concrete-made panel B in accordance with the instant embodiment has a plane defined by longer sides of 4 m, shorter sides of 1.8 m and a thickness of 16 cm, and has a weight per unit area of about 122 kg/m$^2$. As the light-weight concrete of which the first and second concrete layers 1 and 2 are made, the test piece No. 2 in Table 2 was used. Table 4 shows chemical compound of hollow fine particles.

In the light-weight concrete shown in Tables 1 to 3, there was used early-strength cement as a cement, hollow fine particles shown in Table 4, which are formed in the process of formation of slug of a boiler of a thermal power plant using non-powder smokeless charcoal as burning source, having a particle size in the range of 40 to 200 μm, and an average size of about 100 μm were used as hollow fine particles (referred to as "M.B" in Tables 1 to 3), and light-weight aggregates were set to have an average specific gravity of about 1.25.

TABLE 1

| ITEMS | Specific Gravity | Mixture Ratio No. 1 of Test Piece | | |
|---|---|---|---|---|
| | | Kg | Liter | Weight % |
| Early-strength Cement | 3.12 | 2.35 | 0.75 | 28.7 |
| Gypsum | 0.8 | 1.60 | 2.00 | 19.6 |
| M.B | 0.3 | 0.63 | 2.10 | 7.7 |
| Light-weight Aggregate | 1.25 | 3.60 | 2.88 | 44.0 |
| Total | | 8.18 | 7.73 | 100 |
| Water | 1.0 | 2.17 | 2.17 | 26.5 |

TABLE 2

| ITEMS | Specific Gravity | Mixture Ratio No. 2 of Test Piece | | |
|---|---|---|---|---|
| | | Kg | Liter | Weight % |
| Early-strength Cement | 3.12 | 3.12 | 1.00 | 37.0 |
| Gypsum | 0.8 | 1.52 | 1.90 | 18.0 |
| M.B | 0.3 | 0.60 | 2.00 | 7.1 |
| Light-weight Aggregate | 1.25 | 3.19 | 2.55 | 37.8 |
| Total | | 8.43 | 7.45 | 100 |
| Water | 1.0 | 2.55 | 2.55 | 30.2 |

TABLE 3

| ITEMS | Specific Gravity | Mixture Ratio No. 3 of Test Piece | | |
|---|---|---|---|---|
| | | Kg | Liter | Weight % |
| Early-strength Cement | 3.12 | 1.56 | 0.50 | 19.5 |
| Gypsum | 0.8 | 1.60 | 2.00 | 20.0 |
| M.B | 0.3 | 0.75 | 2.50 | 9.4 |
| Light-weight Aggregate | 1.25 | 4.08 | 3.26 | 51.1 |
| Total | | 7.99 | 8.26 | 100 |
| Water | 1.0 | 1.74 | 1.74 | 21.8 |

TABLE 4

| $SiO_2$ | $Al_2O_3$ | $Fe_2O_3$ | CaO | MgO | $K_2O$ |
|---|---|---|---|---|---|
| 49–52 | 49–52 | 2–2.5 | 0.7–0.9 | 0.7–0.9 | 2.5–3 |

Particle Size: 40–200 μm (100 μm in average)
Film Thickness: 0.1–0.2 D
Light-weight: Weight per unit volume 0.25–0.3 g/cc
Fire Resistance: Melting temperature 1650° C.
Heat insulation: Thermal Conductivity 0.03–0.04 kcai/mh ° C.

The light-weight concrete having the mixture ratios shown in Tables 1 to 3 are mixed with water, and solidified by aging 28 days to thereby fabricate concrete test pieces (which correspond to the test pieces No. 1 to No. 3). Specific gravity and the results of experiments on compressive strength of the test pieces are shown in Table 5.

TABLE 5

| Product | Specific Gravity | Compressive Strength (N/mm²) |
|---|---|---|
| Test Piece No. 1 | 1.21 | 14.6 |
| Test Piece No. 2 | 1.29 | 20.7 |
| Test Piece No. 3 | 1.12 | 9.29 |

Figure 14:
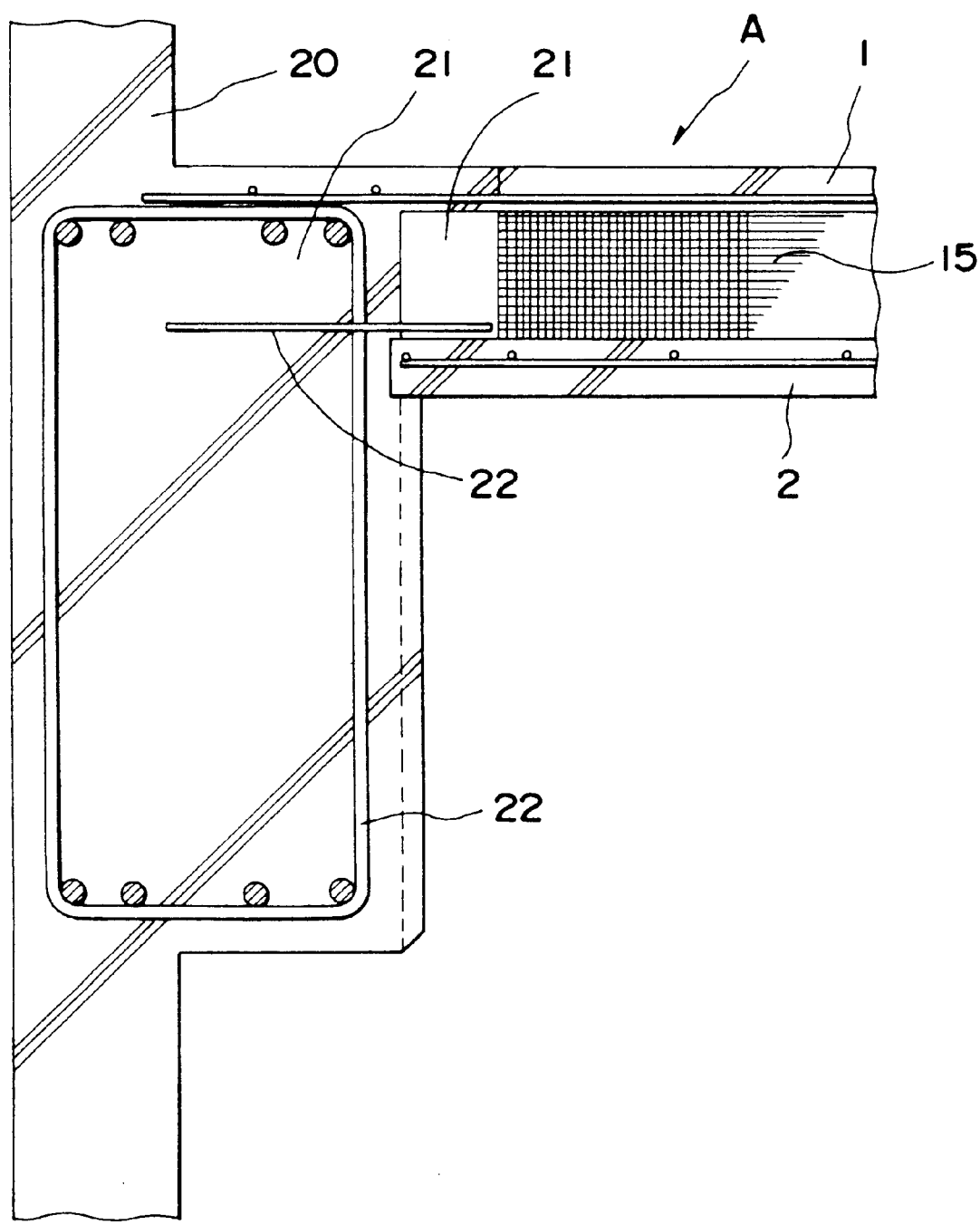
FIG. 14 is a cross-sectional view illustrating a gist of an example of application of the concrete-made panel.

FIG. 14 is a cross-sectional view illustrating a gist of application of the concrete-made panel B.

In FIG. 14, the concrete-made panel B acts as a slab member to an outer wall 20 of a concrete-made construction. The concrete-made panel B is positioned with the first concrete layer 1 facing downwardly and the second concrete layer 2 facing upwardly, and is connected with the outer wall 20 through reinforcing steel bars 22 fixed in a connection 21 formed of concrete introduced and solidified in a construction site.

In accordance with the present invention, there is formed a space between the first and second concrete layers 1 and 2 by connecting the first and second concrete layers 1 and 2 through the corrugated plate 3, ensuring significant decrease in weight of the concrete-made panel. Even if spaces partitioned by the mountain and valley portions of the corrugated plate 3 are filled with the foaming resin 15, it is possible to decrease a weight of the concrete-made panel by about 95 to 145 kg/m² in comparison with ordinary concrete.

In accordance with the present invention, all what to do is to in advance fabricate a concrete-made panel in a factory, and connect the concrete-made panel to a construction by introducing concrete only into a connection portion. Thus, it is no longer necessary to prepare a wide form for fabricating a construction floor or wall, arrange reinforcing steel bars, prepare and introduce a mass of concrete into a form, and cure the concrete, which ensures significantly shortened construction period and reduced costs.

In addition, by filling the corrugated plate 3 with the foaming resin 15, it is possible to obtain sound insulation corresponding to that of concrete slab 200 mm of weight impact sound insulation L-45. Furthermore, by utilizing heat insulation of the foaming resin 15, it is possible to have heat insulation effect 12 times greater than that of ordinary concrete, which ensures advantageous effects for air-conditioning of a construction.

By mixing hollow fine particles in the light-weight concrete of which the first and second concrete layers 1 and 2 are made, it is possible for the concrete-made panel to have a greater strength, a smaller weight, and a hard, but smooth surface. It is also possible to readily cut the concrete-made panel and process into a piece having a desired dimension and shape. Due to light-weight and increased strength, it is possible to fabricate a long span concrete-made panel, specifically a concrete-made panel of 7 mm or longer.

In accordance with the present invention, concrete layers can be formed by partitioning of the formation sheet without a core, it would be possible to save time and cost for fabricating a core, resulting in significant reduction in fabrication cost.

Industrial Applicability

The present invention is applicable to a field of constructing a building, roof, wall, outer wall, and slab of a concrete-made construction.

I claim:

1. A concrete panel comprising:
   a pair of first and second concrete layers spaced away from each other by a certain distance, and
   a corrugated plate having a cross-section of approximately trapezoidal corrugation with approximately planar summit portions and approximately planar bottom portions,
   wherein the corrugated plate is interposed between the first and second concrete layers and the summit portions project into and are integrally connected with the second layer and the bottom portions project into and are integrally connected with the first layer, and wherein the corrugated plate defines a hollow portion between the first and second layers.

2. The concrete panel as set forth in claim 1, further comprising reinforcing steel bars extending in said concrete layers, wherein the steel bars are integrally connected to at least one of the summit portions and bottom portions of the corrugated plate.

3. The concrete panel as set forth in claim 2, wherein said reinforcing steel bars project out of edges of said concrete layers.

4. The concrete panel as set forth in one of claims 1, 2 or 3, wherein at least one of said summit portions and said bottom portions comprise an anchor projecting into at least one of said concrete layers.

5. The concrete panel as set forth in one of claims 1, 2 or 3, wherein said first and second concrete layers have a length longer than a length of said corrugated plate in a direction of a corrugation pitch of said corrugated plate, and opposite ends of said corrugated plate in said direction are located inside of opposite ends of said first and second concrete layers.

6. The concrete panel as set forth in one of claims 1, 2 or 3, wherein said hollow portion is at least partially filled with foaming resin.

7. The concrete panel as set forth in one of claims 1, 2 or 3, wherein said first and second concrete layers comprise cement and aggregate as principal ingredients and further comprise heat resistant hollow fine particles in an amount of from about 6 to about 25 weight %, said heat resistant hollow fine particles having a particle size in the range of from about 40 to about 200 $\mu$m.

8. The concrete panel as set forth in one of claims 1, 2 or 3, wherein said first and second concrete layers comprise light-weight aggregates having an average specific gravity of 1.5 or smaller in an amount of from about 30 to about 55 weight % and cement in an amount of from about 10 to about 50 weight %.

9. A method of fabricating a concrete panel as set forth in claim 2, comprising the steps of:

introducing liquid concrete into a form at a depth equal to a desired thickness of the first concrete layer;

immersing steel bars and bottom portions of the corrugated plate into the concrete before the concrete has hardened;

covering summit portions of the corrugated plate with a deformable formation sheet having a size sufficient to entirely cover the form; and introducing liquid concrete into a recessed portion formed by an upper surface of said formation sheet and an inner surface of said form, and having a depth equal to a thickness of the second concrete layer.

* * * * *